FEEDING SYSTEM FOR PUNCH CARDS AND THE LIKE

Filed April 30, 1963 3 Sheets-Sheet 1

OTTO MODERSON
HUBERTUS BETTIN
Inventors

BY Karl F. Ross
AGENT

FEEDING SYSTEM FOR PUNCH CARDS AND THE LIKE

Filed April 30, 1963

OTTO MODERSON
HUBERTUS BETTIN
Inventors
BY Karl F. Ross
AGENT

Sept. 12, 1967 O. MODERSOHN ET AL 3,341,691

FEEDING SYSTEM FOR PUNCH CARDS AND THE LIKE

Filed April 30, 1963 3 Sheets-Sheet 3

OTTO MODERSOHN
HUBERTUS BETTIN
Inventors

BY Karl G. Ross
AGENT

United States Patent Office 3,341,691
Patented Sept. 12, 1967

3,341,691
FEEDING SYSTEM FOR PUNCH CARDS AND THE LIKE

Otto Modersohn, Volkmarode uber Braunschweig, and Hubertus Bettin, Braunschweig, Germany, assignors to Olympia Werke A.G., Wilhelmshaven, Germany, a corporation of Germany Filed Apr. 30, 1963, Ser. No. 276,916
Claims priority, application Germany, May 2, 1962, O 8,718
4 Claims. (Cl. 235—61.11)

ABSTRACT OF THE DISCLOSURE

System for the feeding of punch cards wherein the leading edge and, if desired, an edge of a perforation of each card successively triggers a plurality of photocells during passage of the card through a reading and/or perforating station, each such triggering resulting in a correlating signal by which the processing equipment of the station is locked in on one of several interleaved trains of timing pulses produced by a generator synchronized with the card-feeding means so that, in the event of card slippage, the timing of the reading and/or perforating cycles can be repeatedly readjusted in accordance with the actual card position.

Our present invention relates to a feeding system for information carriers of sheet material, such as conventional punch cards, which are to be transported in succession past a processing station having means for either the perforation or the reading of such cards.

Though such cards are generally of the same standard size, difficulties have in the past been experienced in the correlation of their motion with the processing equipment unless that motion was controlled by suitable holders therefor which were positively coupled with a driving mechanism. The general object of this invention is to provide means for insuring satisfactory correlation in a system in which the cards are advanced solely by friction, e.g., with the aid of driven transport rollers, with unavoidable and uncontrollable slippage between the cards and their drive means.

This object is realized, pursuant to a feature of our present invention, by the provision of a timing-pulse generator whose output is so synchronized with the frictional feed means for the punch cards that several timing pulses, preferably a multiple of the number of columnar subdivisions of each card, are generated during travel of any one card past a given point along its path. One or more sensing devices, advantageously in the form of photoelectric cells with associated light sources, are disposed along the path of the cards to detect the passage of a card edge; while this edge may conveniently be part of the outline of the card, e.g., its transverse leading edge, it is to be understood that it could also be an edge of one of its perforations or cutouts. At the precise instant when such edge passes one of these detectors, a corrective signal is applied to a circuit which thereupon derives from the timing pulses a train of control pulses whose cadence is related to that of the timing pulses but whose phasing varies with the exact position of the tested card as determined by the corrective signal from the detector. More specifically, this phasing may be established by selecting certain of the timing pulses while suppressing the others, preferably at a cadence of one selected pulse per column of a card. With 80-column cards, for example, 80 control pulses will be produced during the time it takes the card to pass a given detector.

If several detectors are employed, and/or if a detector encounters more than one significant card edge (e.g., the trailing edges of successive perforations aligned in the direction of advance), the arrival of consecutive corrective signals may cause the phasing of the control pulses to shift not only between cards but also during passage of a single card. In this manner any slippage occurring between the card and its feed rollers or equivalent transport means will be promptly compensated.

Though the system of our invention may be used for properly correlating the rate of advance of a series of punch cards or the like with the operation of any processing means therefor, its use will be particularly advantageous with cards that are already partially or completely prepunched since in that case the existing perforations may be utilized in actuating the detectors as explained above.

The invention will be described in greater detail with reference to the accompanying drawing in which.

Figure 1:
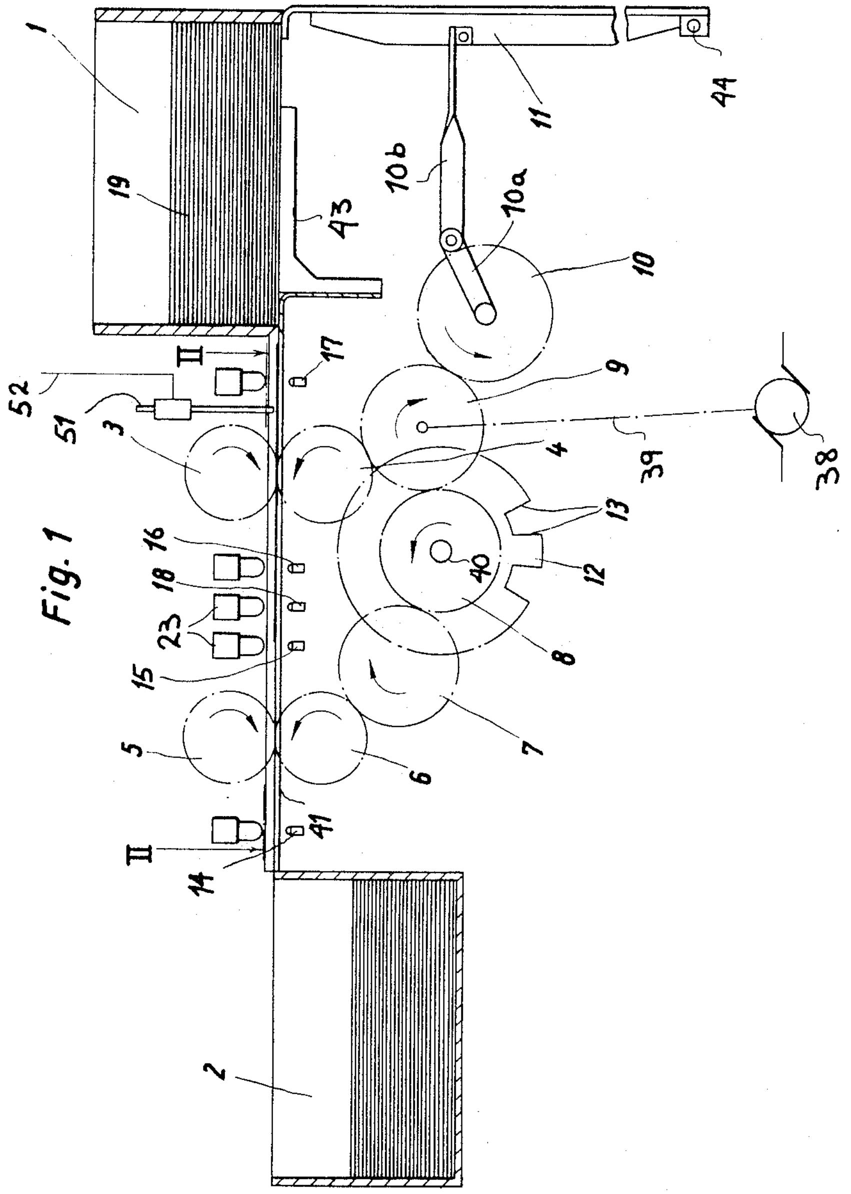
FIG. 1 is a mostly diagrammatic elevational view of a card-feeding system embodying the principles of our invention.
Figures 2, 3, 4, 5:
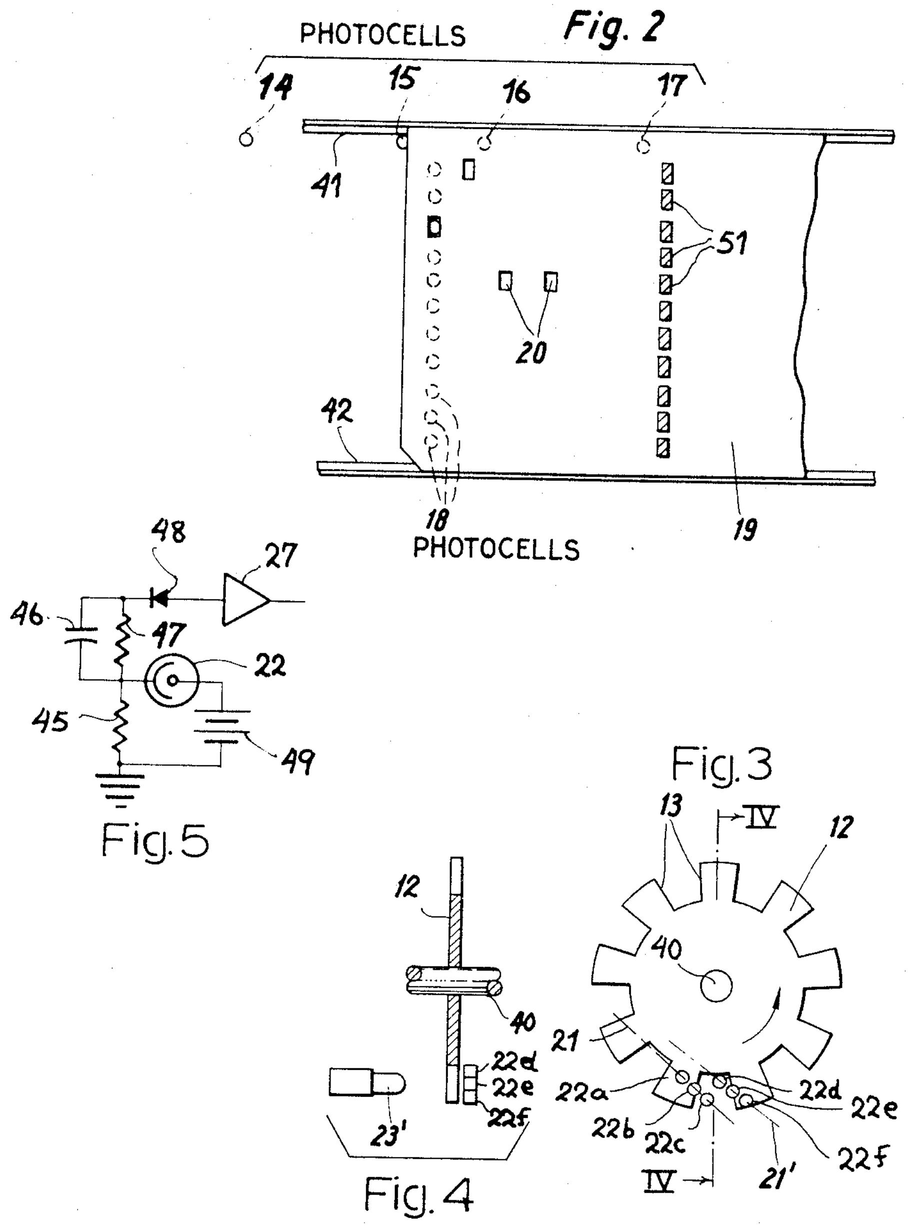
FIG. 2 is a partial top view of the system of FIG. 1 taken substantially on line II—II thereof.
FIG. 3 is a face view of a light chopper forming part of the system of FIGS. 1 and 2.
FIG. 4 is a sectional view taken on the line IV—IV of FIG. 3.
FIG. 5 is a representative circuit diagram of a photocell adapted to be used in the system of FIGS. 1–4.

In FIGS. 1 and 2 we have shown a card-feeding system with a storage bin 1 from which a set of stacked cards 19 are to be transported successively to a receiving bin 2. The transporting mechanism is shown diagrammatically as comprising two pairs of feed rollers 3, 4 and 5, 6 spaced apart in the direction of card movement, at least the lower rollers 4 and 6 being positively driven from a motor 38 via a shaft 39 by means of a main drive gear 9 and an auxiliary gear train 7, 8. The shaft 40 of gear 8 also carries a notched disk 12 more fully illustrated in FIGS. 3 and 4. A further gear 10 meshing with gear 9 drives a crank 10*a*, which, through a pitman 10*b*, reciprocates a swingable arm 11 fulcrumed at 44 to a fixed support not shown. The stack of cards 19 rests on two spaced-apart platforms 43 (only one shown) between which the tip of arm 11 may reciprocate under the urging of crank 10*a* to push the lower-most card out of the stack and move it into the grip of the first pair of feed rollers 3, 4. It will be understood that the mechanism 10, 11 is representative of any conventional means for feeding successive cards from either the top of or the bottom of a stack.

The path of the cards 19 from the bin 1 to the bin 2 is defined by a pair of guide rails 41, 42 between which the rollers 4 and 6 are located. Also disposed between these guide rails, slightly below the level of card travel, are a set of individual photoelectric cells 14, 15, 16 and 17 as well as a group of photoelectric cells 18. The cells 14–16, as also the cells 15–17, lie within a section of this guide path whose length is less than that of the cards. These four cells are located close to the rail 41, thus in the path of a longitudinal marginal zone of each card which is assumed to be free from any perforations. The photocells 18 are arrayed transversely to the direction of card motion so as to be aligned with respective longitudinal zones of the card in which perforations may be present in the several columns thereof; several such perforations have been illustrated at 20 in FIG. 2. Individual light sources 23 overlie the photocells 14–18 so as to direct a sharply focused beam upon each of these cells in the absence of an intervening solid card portion. FIGS. 1 and 2 also show a set of punches 51 which are adapted, in a manner well known per se, to form the perforations 20 at selected locations under the control of signals carried on individual leads 52.

FIGS. 3 and 4 show a timing-pulse generator of which the disk 12 on shaft 40 forms a part. This disk has peripheral notches 13 intermittently interposable in the path of light from a lamp 23′ trained upon an array of photocells 22*a*–22*f*. These photocells, generally designated 22 in FIG. 4, are peripherally and radially staggered with reference to the disk 12 in the region of its notches 13 so as to be uncovered in cyclic succession by the trailing edges of the notch-forming disk teeth and covered in the same order by the leading edges thereof. It will be seen that the photocells 22*a*–22*c* and 22*d*–22*f* are arrayed along substantially straight lines 21, 21′ which are inclined to the radial direction in such manner that all these photocells are successively illuminated as the disk rotates through an angle corresponding to one tooth division thereof, i.e., through 40° in the embodiment illustrated in which nine notches 13 are present on the disk.

FIG. 5 shows a circuit arrangement including one of the photocells 22, this arrangement being, however, representative of any of the cells 14–18 and 22. The object of this arrangement is to insure that an output pulse is produced only when the cell changes its state of conductivity in a predetermined sense, i.e., upon being either covered or uncovered, more specifically when the cell ceases to conduct as the leading edge of a card 19, the trailing edge of a perforation 20 thereof or the trailing edge of a notch 13 passes over it. To this end the cell 22 is shown connected, in series with a voltage source 49, across a cathode resistor 45 whose junction with the cell cathode is connected to an output lead, containing a negatively poled rectifier 48, through a differentiation circuit comprising a condenser 46 shunted by a resistor 47. The output lead of the cell further includes an amplifier 27 also shown in FIG. 6.

Figure 6:
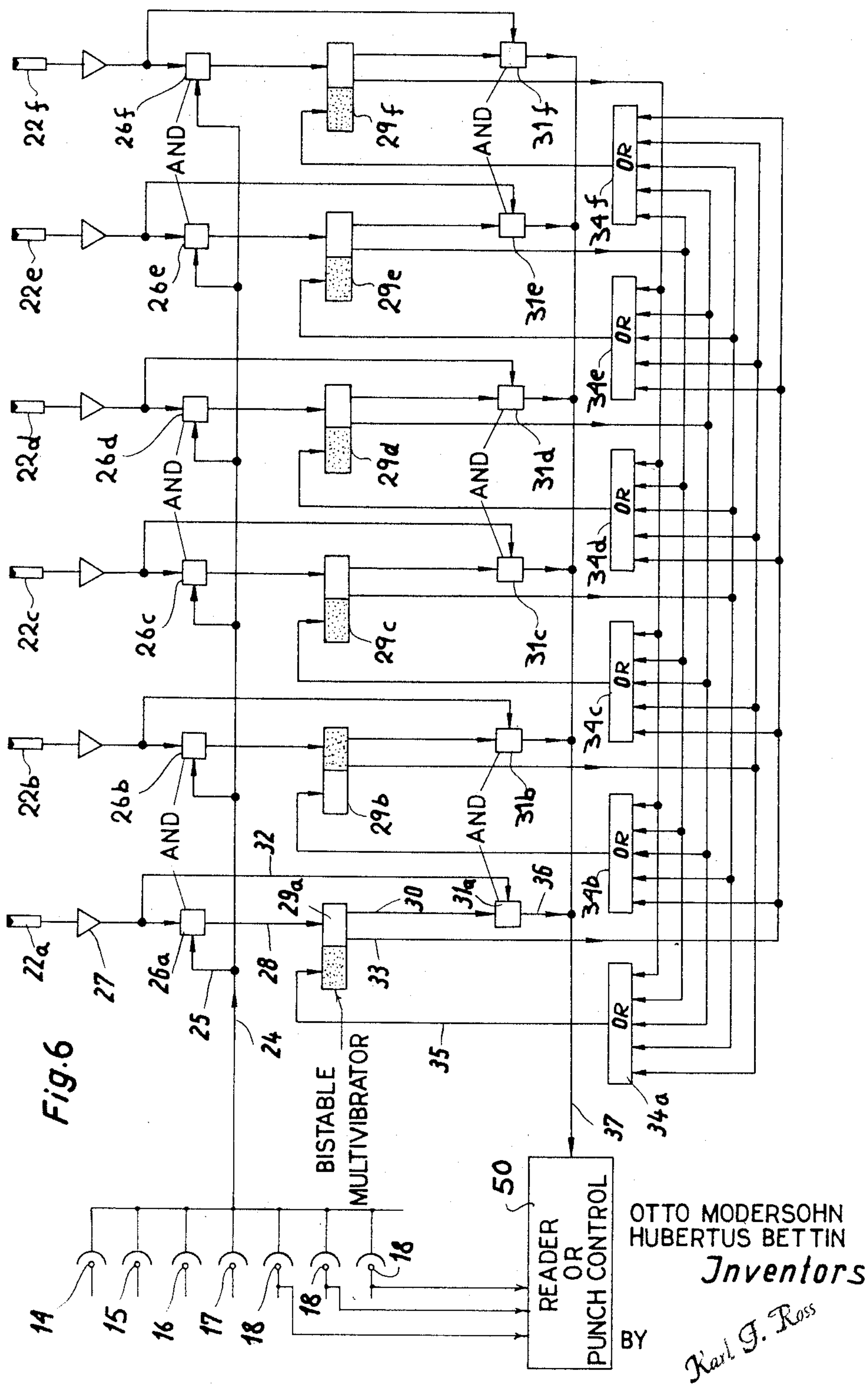
FIG. 6 is an overall circuit diagram of the system.

The control circuit illustrated in FIG. 6 includes the output leads and amplifiers 27 of all the photocells 22*a*–22*f*. A bus bar 24 is multipled to the outputs of all the photocells 14–18 and connected in parallel to one set of inputs of a set of first coincidence or "AND" circuits 26*a*–26*f*; the other inputs of these "AND" circuits are connected to the outputs of the amplifiers 27 associated with the respective cells 22*a*–22*f*. A lead 32 extends from each of these amplifier outputs to one input of a respective second "AND" circuit 31*a*–31*f* whose other input is tied via a lead 30 to an output of a respective bistable electronic switch 29*a*–29*f*, such as a multivibrator, which is normally in a first conductive state as illustrated for the switches 29*a* and 29*c*–29*f*. Another input lead 35 of each multivibrator is connected to the output of a respective "OR" circuit 34*a*–34*f*, each multivibrator having another output lead 33 multipled to the "OR" circuits of all the other multivibrators to reset them to their first conductive state upon being itself triggered into its second conductive state as illustrated for the switch 29*b*. The output leads 36 of the "AND" circuits 31*a*–31*f* are connected in parallel to a common bus bar 37 which leads to a load 50. This load may be, for example, a reader receiving the information from the perforation-sensing photocells 18, in order to control a printer, calculator or the like, in which case the punches 51 shown in FIGS. 1 and 2 could be omitted or deactivated; alternately or additionally, it may also represent a circuit to control in conventional manner the operation of these punches in which event the photocells 18 need not work into the unit 50 and may be disconnected from it by suitable switches not shown.

The operation of the system is as follows:

When a card 19 is fed from the stack in bin 1 to the rollers 3, 4 by the swingable arm 11, photocell 17 is the first one to be obscured by the leading edge of that card.

It will be assumed that the card is divided into 80 transverse columns and that, consequently, the light chopper 12 is rotated at such a rate that, in the absence of a major slippage, eighty notches 13 move past the lamp 23′ during the advance of a card past any photocell. Thus, the six photocells 22*a*–22*f* are energized by the timing-pulse generator 12, 23′ in cyclic and overlapping succession eighty times, i.e., once per column, in the course of such traverse, this corresponding to a train of timing pulses composed of six interleaved pulse trains from the cells 22 with a total of 480 pulses per traverse. The corrective pulse signal delivered by the cell 17 at the beginning of a test cycle sets the pace for the selection of one of these interleaved pulse trains as the train of control pulses to be delivered to load 50 via output conductor 37.

The signal from cell 17 is applied to all the "AND" circuits 26*a*–26*f* by input conductor 24, yet its occurrence coincides with only one of the pulses from the timing cells 22*a*–22*f*, in the assumed example with a pulse from cell 22*b* which in the showing of FIG. 3 has just been covered by the advancing edge of a disk tooth. This coincidence actuates the "AND" circuit 26*b* so that the latter produces an output pulse on its outgoing lead 28 to reverse the associated multivibrator 29*b* which now remains in its alternate state of conductivity for an indefinite period. In this state the multivibrator 29*b* applies an unblocking signal to the coincidence gate 31*b* which simultaneously receives the pulse of cell 22*b* over its input conductor 32 to apply a control pulse to lead 37. The changeover of multivibrator 29*b* has restored, via one of the "OR" circuits 34*a*–34*f*, the one multivibrator which had previously been in the same alternate state of conductivity.

Since only the multivibrators 29*b* is now effective to unblock its gate 31*b*, only the pulses from photocell 22*b* are transmitted to unit 50 during subsequent testing intervals, i.e., during the movement of successive columnar subdivisions of the card 19 past the punches 51 and/or the reading cells 18. If the apparatus is used as a perforator, control device 50 in responding to the pulses on lead 37 will time the operation of the punches 51 to make it coincide accurately with the passage of a columnar zone beneath these punches; if only the reading feature is utilized, the occurrence of the control pulses on lead 37 will determine the exact instants at which the information received by the reader 50 from the photocells 18 is to be evaluated.

As the leading edge of the card in transit passes the next photocell 16, a new corrective pulse appears on the input lead 24. This new pulse may coincide with an output pulse from cell 22*b*, in which case the condition of the multivibrators will remain unchanged to signify the absence of slippage. If, however, the pulse due to response of cell 16 coincides with a different timing pulse, say the one from cell 22*c*, then the latter will reverse its multivibrator 29*c* and the previously operative multivibrator 29*b* will be restored to its quiescent state. The control pulses on lead 37 will thereupon have the phasing of the timing pulses now effective, i.e., those of photocell 22*c* in the case assumed. The same operation recurs, of course, as the card reaches the cells 15 and 14.

If the cards 19 are provided with perforations 20, either from a prior processing or from the operation of the punches 51, the photocells 18 will not only be lit during the entire passage of these perforations thereover, to provide a reading signal (if desired), but also produce a corrective pulse on conductor 24 at the instant when the beam of light trained upon them is extinguished by the oncoming trailing edge of a perforation. These corrective pulses operate in precisely the same way as those from the photocells 14–17 whose effect has been described above.

The system herein disclosed is, of course, capable of numerous modifications without departing from the spirit and scope of the invention as defined in the appended claims.

We claim:

1. A system for correlating the advance of a succession of punch cards with the operation of a processing station for said cards, comprising frictional feed means for advancing said cards along a predetermined path; a generator of timing pulses including a plurality of cyclically energizable pulse sources synchronized with said feed means for producing a plurality of interleaved pulse trains during movement of a single card past a given location along said path; a plurality of sensing devices at spaced-apart locations along said path responsive to the passage of an edge of said card for producing each a corrective signal upon such passage, said sensing devices being disposed along a section of said path shorter than said card; circuit means connected to said generator and said sensing devices for deriving from said signals and said timing pulses a series of control pulses at a cadence related to that of said timing pulses but with a phasing determined by the occurrence of said signals; and output means connected to said circuit means for applying said control pulses to processing equipment at said station, thereby correlating the operation of said processing equipment with the positions of said card at successive stages of said operation; said circuit means comprising a plurality of first coincidence circuits connected in parallel to said sensing devices and individually to respective ones of said pulse sources, a like plurality of bistable electronic switches connected to the outputs of the respective ones of said coincidence circuits for changeover from a first to a second conductive state upon coincidence of a signal from any of said sensing devices with a timing pulse from the associated pulse source, a like plurality of second coincidence circuits each connected to the output of a respective one of said first bistable switches and to the associated pulse source for producing a control pulse only in response to a timing pulse from said associated pulse source with the corresponding bistable switch in its second conductive state, conductor means connected in parallel to the outputs of all said second coincidence circuits, and leads extending from the output of each bistable switch to the inputs of all other bistable switches for restoring any switch from its second to its first conductive state upon changeover of any other switch to its second conductive state.

2. A system as defined in claim 1 wherein said sensing devices include a plurality of first photoelectric cells positioned close to the path of a longitudinal edge of a card for responding to passage of the transverse leading edge of said card only, said sensing devices further including at least one second photoelectric cell positioned in the path of a perforation on said card for responding to passage of the trailing edge of said perforation.

3. A system as defined in claim 1 wherein said generator comprises a rotatable disk with peripheral notches, a plurality of photoelectric cells disposed adjacent said disk for successive and overlapping exposure by said notches, a source of light positioned to illuminate said photoelectric cells through said notches, and an operating circuit for said photoelectric cells including impedance means for producing a timing pulse only upon a predetermined change of conductivity of a cell due to passage of an edge of one of said notches.

4. A system as defined in claim 3 wherein said cells are staggered in both radial and peripheral direction of said disk.

References Cited

UNITED STATES PATENTS

| | | | |
|---|---|---|---|
| 3,020,534 | 2/1962 | Jones | 340—347 |
| 3,173,000 | 3/1965 | Johnson | 235—61.11 |
| 3,184,581 | 5/1965 | Willoughby | 235—61.11 |
| 3,229,073 | 1/1966 | Macker | 235—61.11 |

MAYNARD R. WILBUR, *Primary Examiner.*

R. E. COUNCIL, *Assistant Examiner.*